United States Patent [19]

Kersting et al.

[11] Patent Number: 6,034,023
[45] Date of Patent: Mar. 7, 2000

[54] PREPARATION OF ZIEGLER-NATTA CATALYST SYSTEMS

[75] Inventors: Meinolf Kersting, Bad Duerkheim; Juergen Kerth, Carlsberg; Klaus-Dieter Hungenberg, Birkenau; Peter Koelle, Ludwigshafen, all of Germany

[73] Assignee: BASF Aktiengesellschaft, Lugwigshafen, Germany

[21] Appl. No.: 07/943,025

[22] Filed: Sep. 10, 1992

[51] Int. Cl.[7] ....................................................... C08F 4/64
[52] U.S. Cl. .......................... 502/104; 502/127; 502/120; 526/82; 526/125.3; 526/128
[58] Field of Search ................................... 502/127, 120, 502/104

[56] References Cited

U.S. PATENT DOCUMENTS

| | | | |
|---|---|---|---|
| 4,130,699 | 12/1978 | Hoff et al. | 526/124 |
| 4,282,341 | 8/1981 | Klaerner et al. | 526/138 |

FOREIGN PATENT DOCUMENTS

| | | |
|---|---|---|
| 014 523 | 8/1980 | European Pat. Off. . |
| 023 425 | 2/1981 | European Pat. Off. . |
| 045 975 | 2/1982 | European Pat. Off. . |
| 0 170 410 | 2/1986 | European Pat. Off. . |
| 0 188 914 | 7/1986 | European Pat. Off. . |
| 195 497 | 9/1986 | European Pat. Off. . |
| 0 201 647 | 11/1986 | European Pat. Off. . |
| 201647 | 11/1986 | European Pat. Off. . |

*Primary Examiner*—David W. Wu
*Attorney, Agent, or Firm*—Keil & Weinkauf

[57] ABSTRACT

A novel process for the preparation of Ziegler-Natta catalyst systems containing, as active components, a) a titanium-containing solid component which contains titanium, magnesium, halogen and a carboxylic ester and, as a cocatalyst, b) an aluminum compound and c) if required, a further electron donor is described. Ziegler-Natta catalyst systems which are obtainable by this process, the preparation of polymers of propylene with the aid of these catalyst systems, the polymers obtainable thereby and films and moldings of these polymers are also described.

2 Claims, No Drawings

PREPARATION OF ZIEGLER-NATTA CATALYST SYSTEMS

The present invention relates to a novel process for the preparation of Ziegler-Natta catalyst systems containing, as active components, a) a titanium-containing solid component which contains titanium, magnesium, halogen and a carboxylic ester and, as a cocatalyst, b) an aluminum compound and c) if required, a further electron donor.

The present invention also relates to Ziegler-Natta catalyst systems which are obtainable by this process, the preparation of polymers of propylene with the aid of these catalyst systems, the polymers obtainable thereby and films and moldings of these polymers.

Catalyst systems of the Ziegler-Natta type are disclosed in, inter alia, EP-B 014523, EP-A 023425, EP-A 045975 and EP-A 195497. These systems are used in particular for polymerizing α-olefins and contain, inter alia, compounds of polyvalent titanium, aluminum halides and/or alkylaluminums, and electron donors, in particular silicon compounds, ethers, carboxylic esters, ketones and lactones, which are used on the one hand in conjunction with the titanium component and on the other hand as a cocatalyst.

The Ziegler-Natta catalysts are usually prepared in two steps. First, the titanium-containing solid component is prepared. Then, it is reacted with the cocatalyst. The polymerization is subsequently carried out with the aid of the catalysts thus obtained.

EP-A 427080 describes the preparation of Ziegler-Natta catalysts and the polymerization of propylene catalyzed by said catalysts. These catalysts have good productivity, and the polymerization catalyzed therewith possesses good stereospecificity. However, the morphology of the polymer powder is not sufficiently homogeneous for many purposes; in particular, the fraction of very fine particles having a particle size of less than 0.25 mm should be smaller.

It is an object of the present invention to provide Ziegler-Natta catalyst systems which have high productivity and result in high stereospecificity of the polymerization and a very small fraction of very fine particles in the polymer.

We have found that this object is achieved and that the abovementioned process for the preparation of Ziegler-Natta catalyst systems containing, as active components, a) a titanium-containing solid component which contains titanium, magnesium, halogen and a carboxylic ester and, as a cocatalyst, b) an aluminum compound and c) if required, a further electron donor, gives particularly suitable catalyst systems if, after the reaction of the titanium-containing solid component with the cocatalyst, the reaction mixture is deactivated by reaction with carbon dioxide.

In addition to a titanium-containing solid component, the Ziegler-Natta catalysts used also contain, inter alia, a cocatalyst. A suitable cocatalyst is an aluminum compound. In addition to this aluminum compound, an electron donor is preferably also used as a further component of the cocatalyst.

For the preparation of the titanium-containing solid compounds, halides or alcoholates of trivalent or tetravalent titanium are generally used as titanium compounds, the chlorides of titanium, in particular titanium tetrachloride, being preferred. The titanium-containing solid component advantageously has a finely divided carrier, for which silicas and aluminas, as well as aluminum silicates, have proven suitable. A particularly preferably used carrier is $SiO_2 \cdot aAl_2O_3$, where a is from 0 to 2, in particular from 0 to 0.5.

Compounds of magnesium are also among the compounds used in the preparation of the titanium-containing solid component. Particularly suitable compounds of this type are magnesium halides, alkylmagnesiums and arylmagnesiums, as well as alkoxymagnesium and aryloxymagnesium compounds, magnesium dichloride, magnesium dibromide and di-($C_1$–$C_{10}$-alkyl)-magnesium compounds being preferably used. The titanium-containing solid component may also contain halogen, preferably chlorine or bromine.

The titanium-containing solid component furthermore contains electron donors, for example mono- or polyfunctional carboxylic acids, carboxylic anhydrides and carboxylic esters, as well as ketones, ethers, alcohols, lactones and organophosphorus and organosilicones. Phthalic acid derivatives of the general formula I

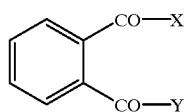

I where X and Y are each chlorine or $C_1$–$C_{10}$-alkoxy or together are oxygen, are preferably used as electron donors in the titanium-containing solid component. Particularly preferred electron donors are phthalic esters, where X and Y are each $C_1$–$C_8$-alkoxy, for example methoxy, ethoxy, propoxy or butoxy.

Other preferred electron donors in the titanium-containing solid component include diesters of 3-membered or 4-membered, unsubstituted or substituted cycloalkyl-1,2-dicarboxylic acids of the general formulae IIa and IIb, and monoesters of unsubstituted or substituted benzophenone-2-carboxylic acids of the general formula III

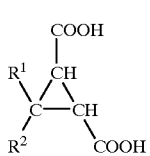

IIa

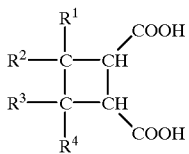

IIb

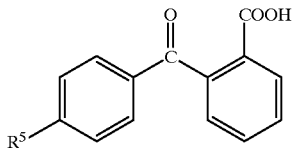

III

In the above formulae, $R^1$, $R^2$, $R^3$ and $R^4$ independently of one another may each be hydrogen, $C_1$–$C_{15}$-alkyl, $C_7$–$C_{15}$-alkylaryl or 5-membered to 7-membered cycloalkyl which in turn may carry $C_1$–$C_{10}$-alkyl groups, and $R^5$ in formula III may be hydrogen, $C_1$–$C_5$-alkyl or chlorine.

The hydroxy compounds used for these esters are the alcohols which are customary in esterification reactions, including $C_1$–$C_{15}$-alkanols, $C_5$–$C_7$-cycloalkanols, which in turn may carry $C_1$–$C_{10}$-alkyl groups, and $C_6$–$C_{10}$-phenols.

The titanium-containing solid component can be prepared by conventional methods. Examples of these are described in, inter alia, EP-A 45 975, EP-A 45 977, EP-A 86 473, EP-A171 200 and GB-A 2 111 066.

The following two-stage process is preferably used for the preparation of the titanium-containing solid component: In the first stage, a solution of the magnesium-containing compound in a liquid alkane is first added to a finely divided carrier, preferably $SiO_2 \cdot aAl_2O_3$, where a is from 0 to 2, in particular from 0 to 0.5, which as a rule has a particle diameter of from 0.1 to 1,000 µm, in particular from 10 to 300 µm, a pore volume of from 0.1 to 10, in particular from 1.0 to 4.0, cm$^3$/g and a specific surface area of from 10 to 1,000, in particular from 100 to 500, m$^2$/g, after which this mixture is stirred for from 0.5 to 5 hours at from 10 to 120° C. From 0.1 to 1 mol of the magnesium compound is preferably used per mol of the carrier. Thereafter, a halogen or a hydrogen halide, in particular chlorine or hydrogen chloride, is added in not less than a two-fold, preferably not less than a five-fold, molar excess, based on the magnesium-containing compound, with constant stirring. After from about 30 to 120 minutes, a $C_1$–$C_8$-alkanol, in particular ethanol, a halide or an alcoholate of trivalent or tetravalent titanium, in particular titanium tetrachloride, and an electron donor are added to this reaction product at from 10 to 150° C. From 1 to 5 mol of the trivalent or tetravalent titanium and from 0.01 to 1, in particular from 0.1 to 0.5, mol of the electron donor are used per mol of magnesium of the solid obtained in the first stage. This mixture is stirred for not less than one hour at from 10 to 150° C., and the solid substance thus obtained is then filtered off and washed with a $C_7$–$C_{10}$-alkylbenzene, preferably with ethylbenzene.

In the second stage, the solid obtained in the first stage is extracted for a few hours at from 100 to 150° C. with excess titanium tetrachloride or with a solution of titanium tetrachloride in an inert solvent, preferably an alkylbenzene, said solution being present in excess and the solvent containing not less than 5% by weight of titanium tetrachloride. The product is then washed with a liquid alkane until the wash liquid contains less than 2% by weight of titanium tetrachloride.

The titanium-containing solid component obtainable in this manner is used with a cocatalyst as the Ziegler-Natta catalyst system. Aluminum compounds are suitable cocatalysts.

Aluminum compounds which are suitable cocatalysts are trialkylaluminum as well as compounds in which an alkyl group is replaced with an alkoxy group or with a halogen atom, for example with chlorine or bromine. Trialkylaluminum compounds whose alkyl groups are each of 1 to 8 carbon atoms, for example trimethyl-, triethyl- or methyldiethylaluminum, are preferably used.

In addition to the aluminum compound, electron donors, for example mono- or polyfunctional carboxylic acids, carboxylic anhydrides or carboxylic esters as well as ketones, ethers, alcohols, lactones and organophosphorus and organosilicon compounds, are also preferably used as further cocatalysts. Preferred electron donors are organosilicon compounds of the general formula IV

$$R^1_n Si(OR^2)_{4-n} \qquad \text{IV}$$

where $R^1$ is $C_1$–$C_{20}$-alkyl, 5-membered to 7-membered cycloalkyl which in turn may carry $C_1$–$C_{10}$-alkyl, or $C_6$–$C_{20}$-aryl or arylalkyl, $R^2$ is $C_1$–$C_{20}$-alkyl and n is 1, 2 or 3. Particularly preferred compounds are those in which $R^1$ is $C_1$–$C_8$-alkyl or 5-membered to 7-membered cycloalkyl, $R^2$ is $C_1$–$C_4$-alkyl and n is 1 or 2.

Among these compounds, dimethoxydiisopropylsilane, dimethoxyisobutylisopropylsilane, dimethoxydiisobutylsilane, dimethoxydicyclopentylsilane and diethoxyisobutylisopropylsilane are particularly noteworthy.

The individual catalyst components can be introduced into the polymerization system in any order, individually or as a mixture of two components.

The novel Ziegler-Natta catalyst systems are prepared by first reacting the titanium-containing solid component with the cocatalyst.

The reaction is advantageously carried out in the liquid phase. If the cocatalyst is present as a liquid at the reaction temperature, the reaction may be carried out in the presence or absence of a solvent. If the cocatalyst is present as a solid at the reaction temperature, it is advisable to use an inert solvent.

Suitable solvents are liquid hydrocarbons, preferably $C_5$–$C_{10}$-alkanes, particularly preferably hexane or heptane, or mixtures of hydrocarbons.

The cocatalyst is reacted with the titanium-containing solid component at from −20 to 60° C., preferably from 0 to 25° C. For this purpose, the titanium-containing solid component is advantageously suspended in the cocatalyst or in the cocatalyst solution.

Preferably used mixtures are those in which the molar ratio of aluminum compound to titanium from the titanium-containing solid component is from 0.1:1 to 10:1, in particular from 1:1 to 5:1, and the molar ratio of aluminum compound to organosilicone compound is from 0.1:1 to 200:1, in particular from 3:1 to 30:1.

The reaction time is not more than three hours, preferably not more than 30 minutes.

The Ziegler-Natta catalyst system is activated by reaction with the cocatalyst and is then reacted with dry carbon dioxide.

The reaction is carried out at from −20 to 60° C., preferably from 0 to 25° C.

The carbon dioxide may be passed as a gas directly into the catalyst suspension. Carbon dioxide can also be added in solid form to the catalyst suspension. However, it is also possible to fill the gas space above the suspension with carbon dioxide, preferably at from 1 to 30, particularly preferably at from 1 to 8, bar. This form of reaction with carbon dioxide is preferred.

For more rapid reaction, the catalyst suspension can be stirred during the reaction with carbon dioxide.

The duration of the reaction is usually not more than 3, preferably from 0.5 to 3, hours.

As a result of the reaction with carbon dioxide, the catalyst system is deactivated, ie. it is as a rule no longer active with regard to polymerization. The catalyst systems thus prepared have a long shelf life. They can be stored, for example, as a solid.

Before being used in a polymerization reaction, the catalyst systems prepared according to the invention are activated again by reaction with a cocatalyst.

The compounds used in the reaction with the titanium-containing solid component may be employed as cocatalysts.

The cocatalysts are preferably used in an amount such that the atomic ratio of aluminum from the aluminum compound to titanium from the titanium-containing solid component is from 10:1 to 800:1, in particular from 20:1 to 200:1, and the molar ratio of the aluminum compound to the electron donor used as a cocatalyst is 1:1 to 100:1, in particular from 2:1 to 80:1.

The catalyst systems prepared according to the invention are particularly suitable for the preparation of polymers of propylene and of polymers of propylene together with other α-olefins.

The preparation of polyolefins, in particular of polymers of propylene, can be carried out in the conventional reactors used for the polymerization of propylene, either batchwise or, preferably, continuously, inter alia as a suspension polymerization or, preferably, as a gas-phase polymerization. Suitable reactors include continuously operated stirred reactors which contain a fixed bed of finely divided polymer which is usually kept in motion by suitable stirring apparatuses. The reaction can of course also be carried out in a plurality of reactors connected in series. The reaction time depends decisively on the reaction conditions chosen in each case. It is usually from 0.2 to 20, in general from 0.5 to 10, hours.

In addition to the homopolymerization of propylene, copolymers and terpolymers of propylene with other α,β-unsaturated olefinic compounds of 2 to 8 carbon atoms, can also be prepared, for example of α-monoolefins or of bifunctional α-olefins, such as hexa-1,5-diene. Particularly suitable comonomers are ethylene, but-1-ene, pent-1-ene, hex-1-ene and oct-1-ene. Comonomers which are particularly suitable for the terpolymerization are ethylene and but-1-ene.

The copolymers obtained may be both block-type and random or alternating. The novel catalyst system is also particularly suitable for the preparation of propylene/ethylene copolymers containing not more than 10% by weight of polymerized ethylene, and of terpolymers of propylene containing minor amounts of polymerized ethylene and but-1-ene.

The polymerization reaction is advantageously carried out at from 20 to 150° C., preferably from 40 to 100° C., and from 1 to 100, preferably from 10 to 50, bar. The molecular weight of the resulting polyolefins can be regulated and brought to a narrower distribution by adding regulators conventionally used in polymerization technology, for example hydrogen. Inert solvents, for example toluene or hexane, an inert gas, such as nitrogen or argon and small amounts of polypropylene powder may also be present.

The propylene homo- and copolymers which can be prepared according to the invention are obtainable with the molecular weights customary for the polyolefins, polymers having molecular weights of from 20,000 to 500,000 being preferred.

Compared with the conventional catalyst systems, the novel catalyst system has a higher productivity and improved stereospecificity, in particular in gas-phase polymerizations. The polymers obtainable in this manner possess in particular a very small fraction of very fine particles having a particle size of less than 0.25 mm, very good flow properties, a high bulk density and a low residual chlorine content.

In the copolymerization of propylene with α,β-unsaturated olefins, the polymers obtained according to the invention have an extremely small fraction of coarse particles (particles larger than 5 mm).

Because of their good mechanical properties, the propylene polymers prepared using the novel catalyst system are particularly suitable for the production of films and moldings.

EXAMPLES

Example 1 a) Preparation of the Titanium-Containing Solid Component (1)

In a first stage, a solution of n-butyloctyl-magnesium in n-heptane was added to $SiO_2$ which had a particle diameter of from 20 to 45 μm, a pore volume of 1.7 ml/g and a specific surface area of 330 m$^2$/g, 0.3 mol of the magnesium compound being used per mol of $SiO_2$. The solution was stirred for 45 minutes at 40° C. and then cooled to 20° C., after which a 10-fold molar amount, based on the organomagnesium compound, of hydrogen chloride was passed in. After 60 minutes, 3 mol of ethanol per mol of magnesium were added to the reaction product with constant stirring. This mixture was stirred for 0.5 hour at 80° C., after which 7.2 mol of titanium tetrachloride and 0.3 mol of diisobutyl phthalate, dissolved in ethylbenzene, were added, the amounts being based on 1 mol of magnesium in each case. Stirring was then carried out for 1 hour at 100° C., and the solid substance thus obtained was filtered off and was washed several times with ethylbenzene.

The solid product obtained therefrom was extracted for 3 hours at 125° C. with a 10% strength by volume solution of titanium tetrachloride in ethylbenzene. Thereafter, the solid product was separated from the extracting agent by filtration and was washed with n-heptane until the extracting agent contained only 0.33% by weight of titanium tetrachloride.

The titanium-containing solid component contained 3.6% by weight of Ti, 7.7% by weight of Mg and 27.9% by weight of Cl.

b) Preactivation of the Titanium-Containing Solid Component and Subsequent Deactivation 700 ml of n-heptane were initially taken in a 1 l glass autoclave provided with a stirrer, and the reaction vessel was cooled to an internal temperature of 5° C. 47.4 ml of triethylaluminum (in the form of a 1.0 molar solution in n-heptane) and 1.3 ml of dimethoxyisobutylisopropylsilane (in the form of a 1.0 molar solution in n-heptane) were added to the solvent. 20 g of the titanium-containing solid component prepared according to Example 1a were then added. After a contact time of 5 minutes, gaseous, dry $CO_2$ (flow rate: 14.5 l/h) was then passed continuously into the catalyst suspension via an inlet tube for 1 hour at 1 bar. This resulted in deactivation of the catalyst suspension which was active with regard to polymerization.

23.3 g of a solid were obtained.

c) Polymerization of Propylene

The polymerization was carried out in a vertically stirred gas-phase reactor having an effective volume of 800 l, in the presence of hydrogen as a molecular weight regulator. The reactor contained an agitated fixed bed of finely divided polymer. The polymer output of the reactor was 85 kg of polypropylene per hour in all Examples.

Gaseous propylene was passed into the gas phase reactor at 32 bar and 80° C. Polymerization was carried out continuously with a mean residence time of 2.5 hours with the aid of the catalyst system described in Example 1b, 4.3 g of the catalyst system described in Example 1b, 250 mmol of triethylaluminum and 25 mmol of dimethoxyisobutylisopropylsilane being used per hour as the cocatalyst.

After the end of the gas phase polymerization, a propylene homopolymer having a melt flow index of 8.0 g/10 min, determined at 230° C. and 2.16 kg according to DIN 53,735, was obtained. The productivity of the catalyst system, which is defined as the ratio of the amount of polymer formed to the amount of titanium-containing solid component, the xylene-soluble or heptane-soluble fraction, which is a measure of the amount of nonisotactic structural units, the very fine particle fraction (<0.25 mm) and the chlorine content of the polymer are summarized in Table 1 below.

COMPARATIVE EXPERIMENT A

Propylene was polymerized using the catalyst system of Example 1a according to Example 1; in contrast to Example 1, the novel process of preactivation and subsequent deactivation, described in Example 1b, was omitted.

The results of this Comparative Experiment A without preactivation/deactivation of the catalyst component according to Example 1a are shown in the Table below.

Example 2

The titanium-containing solid component was prepared according to Example 1a.

The preactivation and subsequent deactivation of the titanium-containing solid component were carried out according to Example 1b, except that the 1.3 ml of dicyclopentyldimethoxysilane were used as the organosilicon compound.

This preactivated catalyst was used to polymerize propylene according to Example 1c, except that dicyclopentyldimethoxysilane was used as the organosilicon compound. The results are shown in Table 1 below.

COMPARATIVE EXPERIMENT B

Propylene was polymerized using the catalyst system of Example 1a according to Example 2, except that dicyclopentyldimethoxysilane was used as the organosilicon component and the novel process of preactivation/deactivation of the catalyst system was omitted. The results are summarized in Table 1 below.

TABLE 1

| | Productivity (g of polymer/ g of titanium-containing solid component | Heptane-soluble fraction (% by wt.) | Particle size distribution <0.25 mm (%) | Chlorine content (ppm) |
| --- | --- | --- | --- | --- |
| Example 1 | 24,600 | 1.3 | 0.5 | 10 |
| Comparative Example A | 20,500 | 1.3 | 2.9 | 12 |
| Example 2 | 35,140 | 1.3 | 0.2 | 7 |
| Comparative Example B | 17,770 | 1.5 | 2.3 | 14 |

The Examples for the copolymerization of propylene with other olefins were carried out in a vertically stirred gas phase reactor having an effective volume of 800 l, in the presence of hydrogen as a molecular weight regulator. The reactor contained an agitated fixed bed of finely divided polymer. The polymer output of the reactor was 85 kg of polypropylene per hour in all Examples.

Example 3

A gaseous mixture of propylene and ethylene was passed into the gas phase reactor at 23 bar and 80° C., the ratio of the partial pressure of the propylene to that of the ethylene being 25:1. This mixture was continuously polymerized with a mean residence time of 2.5 hours with the aid of a Ziegler-Natta catalyst prepared according to Examples 1a and 1b, 2.5 g of a titanium-containing solid component, 250 mmol of triethylaluminum and 25 mmol of dimethoxyisobutylisopropylsilane being used per hour as catalyst components.

Example 4

Propylene and ethylene were polymerized according to Example 3. However, the ratio of the partial pressure of propylene to that of ethylene was brought to 20:1.

Example 5

A gaseous mixture of propylene, ethylene and but-1-ene was polymerized using the same catalyst system as in Example 3 and under reaction conditions otherwise identical to those in that Example. The ratio of the partial pressure of propylene to that of ethylene to that of but-1-ene was 25:1:0.65 and the mean residence time of the polymer was 2.7 hours.

Example 6

Propylene, ethylene and but-1-ene were polymerized according to Example 5. However, polymerization was effected with a ratio of the partial pressure of propylene to that of ethylene to that of but-1-ene of 20:1:0.9.

COMPARATIVE EXPERIMENTS C TO F

Comparative Experiments C to F were carried out according to Examples 3–6, except that the novel process of preactivation/deactivation was omitted. The results are shown in Table 2.

TABLE 2

| | Comonomer content of polymer (% by wt.) | | Productivity (g of polymer/ g of titanium-containing solid component | Bulk density g/l | Xylene-soluble fraction (% by wt.) |
| --- | --- | --- | --- | --- | --- |
| | C2 | C4 | | | |
| Example 3 | 2.9 | — | 24,600 | 418 | 3.8 |
| Comparative Example C | 2.6 | — | 15,670 | 406 | 4.0 |
| Example 4 | 3.6 | — | 24,600 | 442 | 5.3 |
| Comparative Example D | 3.8 | — | 29,000 | 362 | 7.3 |
| Example 5 | 3.8 | 2.3 | 22,580 | 378 | 9.4 |
| Comparative Example E | 3.9 | 2.3 | 19,170 | 350 | 10.3 |
| Example 6 | 4.0 | 5.5 | 30,125 | 311 | 12.7 |
| Comparative Example F | 4.8 | 5.2 | 18,920 | 377 | 16.5 |

We claim:

1. A process for the preparation of a deactivated Ziegler-Natta catalyst system with a long storage life, suitable upon reactivation, for the preparation of polymers of propylene and of polymers of propylene together with other α-olefins containing, as active components, a catalyst suspension of
   a) a titanium-containing solid component which contains titanium, magnesium, halogen and a carboxylic ester and, as a cocatalyst,
   b) an aluminum compound and
   c) an organosilicon compound as a further cocatalyst;
   which process comprises reacting components a), b), and c), wherein, after the reaction, the reaction mixture is deactivated by reaction with carbon dioxide, whereby gaseous carbon dioxide is introduced into the gas space above the catalyst suspension at from 1 to 30 bar.
2. A Ziegler-Natta catalyst system prepared by a process as claimed in claim 1.

* * * * *